US008738246B2

(12) United States Patent
Takemori et al.

(10) Patent No.: US 8,738,246 B2

(45) Date of Patent: May 27, 2014

(54) CVT CONTROL APPARATUS

(75) Inventors: Yuichiro Takemori, Wako (JP); Yuzo Okubo, Wako (JP); Masatoshi Noguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 764 days.

(21) Appl. No.: 12/910,656

(22) Filed: Oct. 22, 2010

(65) Prior Publication Data

US 2011/0106387 A1 May 5, 2011

(30) Foreign Application Priority Data

Oct. 30, 2009 (JP) ................................ 2009-251086

(51) Int. Cl.

*G06F 7/00* (2006.01)
*G06F 17/00* (2006.01)
*G06F 19/00* (2011.01)

(52) U.S. Cl.

USPC .................. 701/53; 701/61; 701/78; 701/83; 701/87; 474/8; 474/18; 477/182

(58) Field of Classification Search

USPC ........... 701/53, 60, 61, 65, 67, 70, 71, 75, 78, 701/81, 82, 83, 87; 474/8, 18; 477/182

See application file for complete search history.

(56) References Cited

U.S. PATENT DOCUMENTS

| | | | | |
|---|---|---|---|---|
| 5,112,280 | A * | 5/1992 | Sato | 474/18 |
| 6,547,692 | B1 | 4/2003 | Rics-Mueller et al. | |
| 7,041,018 | B2 * | 5/2006 | Ochiai et al. | 474/28 |
| 2004/0063525 | A1 * | 4/2004 | Ochiai et al. | 474/28 |
| 2004/0063526 | A1 * | 4/2004 | Nobu | 474/28 |
| 2004/0242355 | A1 * | 12/2004 | Yamaguchi et al. | 474/18 |
| 2006/0136111 | A1 | 6/2006 | Robert et al. | |
| 2006/0172829 | A1 * | 8/2006 | Ishio | 474/18 |
| 2006/0184304 | A1 * | 8/2006 | Katou et al. | 701/54 |
| 2006/0234828 | A1 * | 10/2006 | Iwatsuki et al. | 477/45 |
| 2009/0264231 | A1 * | 10/2009 | Ogata et al. | 474/11 |
| 2009/0270222 | A1 * | 10/2009 | Lee | 477/46 |

FOREIGN PATENT DOCUMENTS

| | | | |
|---|---|---|---|
| EP | 1 605 190 | A2 | 12/2005 |
| JP | 60-244666 | A | 12/1985 |
| JP | 60-255560 | | 12/1985 |
| JP | 04-29580 | B2 | 5/1992 |
| JP | 04-244657 | | 9/1992 |
| JP | 07-137624 | A | 5/1995 |
| JP | 2917064 | B2 | 7/1999 |
| JP | 2001-253333 | A | 9/2001 |
| JP | 2003-028287 | A | 1/2003 |
| JP | 2003-042275 | A | 2/2003 |

OTHER PUBLICATIONS

Chinese Office Action dated Apr. 1, 2013 with English Translation.

* cited by examiner

*Primary Examiner* — Khoi Tran
*Assistant Examiner* — Jaime Figueroa
(74) *Attorney, Agent, or Firm* — Arent Fox LLP

(57) ABSTRACT

In an apparatus for controlling a CVT that transmits power of an engine to driven wheels with hydraulic clamping pressure supplied from a hydraulic mechanism to clamp the belt from laterally-sided pulleys, it is determined whether the ABS operation of the ABS mechanism (to reduce braking force to be applied to the driven wheels when the driven wheels are locked) is delayed, and set hydraulic clamping pressure is increased when the ABS operation is determined to be delayed, while the set clamping pressure is maintained as it is when the operation of the ABS mechanism is determined to be not delayed.

10 Claims, 3 Drawing Sheets

CVT ECU
ENG ECU
ABS ECU
ABS
M
POS
DBW
INJ
NE
PBA
TH
NDR
VEL
MS
CS
SS
W
D
10
12
14
16
20
22
22a
22b
22c
24
24a
24b
24c
24d
24e
26
26a
26a1
26a2
26b
26b1
26b2
26c
30
32
34
36
40
42
44
50
52
54
56
60
62
64
66
70
72
74
76
78
80
82
84
84a
84b
84c
86
88
90

DN
26b21
DR
26a21
RVS
24e1
FWD
24d1
DN REG VLV
42f
DR REG VLV
42e
78
MAN VLV
42o
CR SFT VLV
42n
42x
LS-DN
42k
LS-DR
42j
LS-CPC
42l
42
42d
42c
PH REG VLV
42a
42b
76
E
10
CR VLV
42h
42g
42i
42p
TC REG VLV
42q
LC SFT VLV
42s
LC CTL VLV
42r
42w
SOL-A
42u
SOL-B
42v
22c1
22c
22c2
22
×

CVT CONTROL APPARATUS

BACKGROUND OF THE INVENTION

1. Field of the Invention

This invention relates to a CVT (Continuous Variable Transmission) control apparatus, particularly to an apparatus that corrects pulley clamping pressure in response to the presence/absence of delay in the operation of an ABS (Anti-lock Braking System) mechanism.

2. Description of the Related Art

An ABS mechanism is well known which, when a driven wheel is locked, decreases braking force applied to the driven wheel through a braking mechanism so as to prevent a skid. A technique is proposed, for example, by Japanese Patent Publication No. Hei 4 (1992)-29580, to delay the operation of the ABS mechanism for preventing a braking distance from increasing on a bad or slippery road surface. Another technique is taught, for example, by Japanese Patent No. 2917064, to increase primary pressure when the ABS mechanism is operated.

SUMMARY OF THE INVENTION

As can be seen from the above references, when the operation of the ABS mechanism is delayed, since torque to be inputted to a CVT is increased due to inertia torque caused by the abrupt decrease in rotational speed of the wheel upon sudden braking, it is necessary to increase pulley clamping pressure to avoid slippage of the belt. However, the increase in pulley clamping pressure adversely affects the durability of the CVT.

An object of this invention is therefore to overcome the foregoing drawback by providing a CVT control apparatus that corrects pulley clamping pressure in accordance with a determination result as to whether the operation of an ABS mechanism is delayed, thereby improving durability of a CVT.

In order to achieve the object, this invention provides in its first aspect an apparatus for controlling a CVT mounted on a vehicle and transmitting power of a prime mover to a driven wheel through a belt wound around a drive pulley and a driven pulley that are supplied with hydraulic clamping pressure from a hydraulic mechanism to clamp the belt from lateral sides, an ABS mechanism adapted to reduce braking force to be applied to the driven wheel and an ABS controller for controlling operation of the ABS mechanism when the driven wheel is detected to be locked, comprising: a pulley clamping pressure setting unit that sets the hydraulic clamping pressure of the pulleys based on torque to be transmitted by the belt; an ABS operation delay determiner that determines whether the operation of the ABS mechanism is delayed by the ABS controller; and a clamping pressure corrector that corrects the set hydraulic clamping pressure of the pulleys in accordance with a determination result of the ABS operation delay determiner.

In order to achieve the object, this invention provides in its second aspect a method of controlling a CVT mounted on a vehicle and transmitting power of a prime mover to a driven wheel through a belt wound around a drive pulley and a driven pulley that are supplied with hydraulic clamping pressure from a hydraulic mechanism to clamp the belt from lateral sides, an ABS mechanism adapted to reduce braking force to be applied to the driven wheel and an ABS controller for controlling operation of the ABS mechanism when the driven wheel is detected to be locked, comprising the steps of: setting the hydraulic clamping pressure of the pulleys based on torque to be transmitted by the belt; determining whether the operation of the ABS mechanism is delayed by the ABS controller; and correcting the set hydraulic clamping pressure of the pulleys in accordance with a determination result of the ABS operation delay determiner.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A preferred embodiment of a CVT control apparatus according to the invention will now be explained with reference to the attached drawings.

Figure 1:
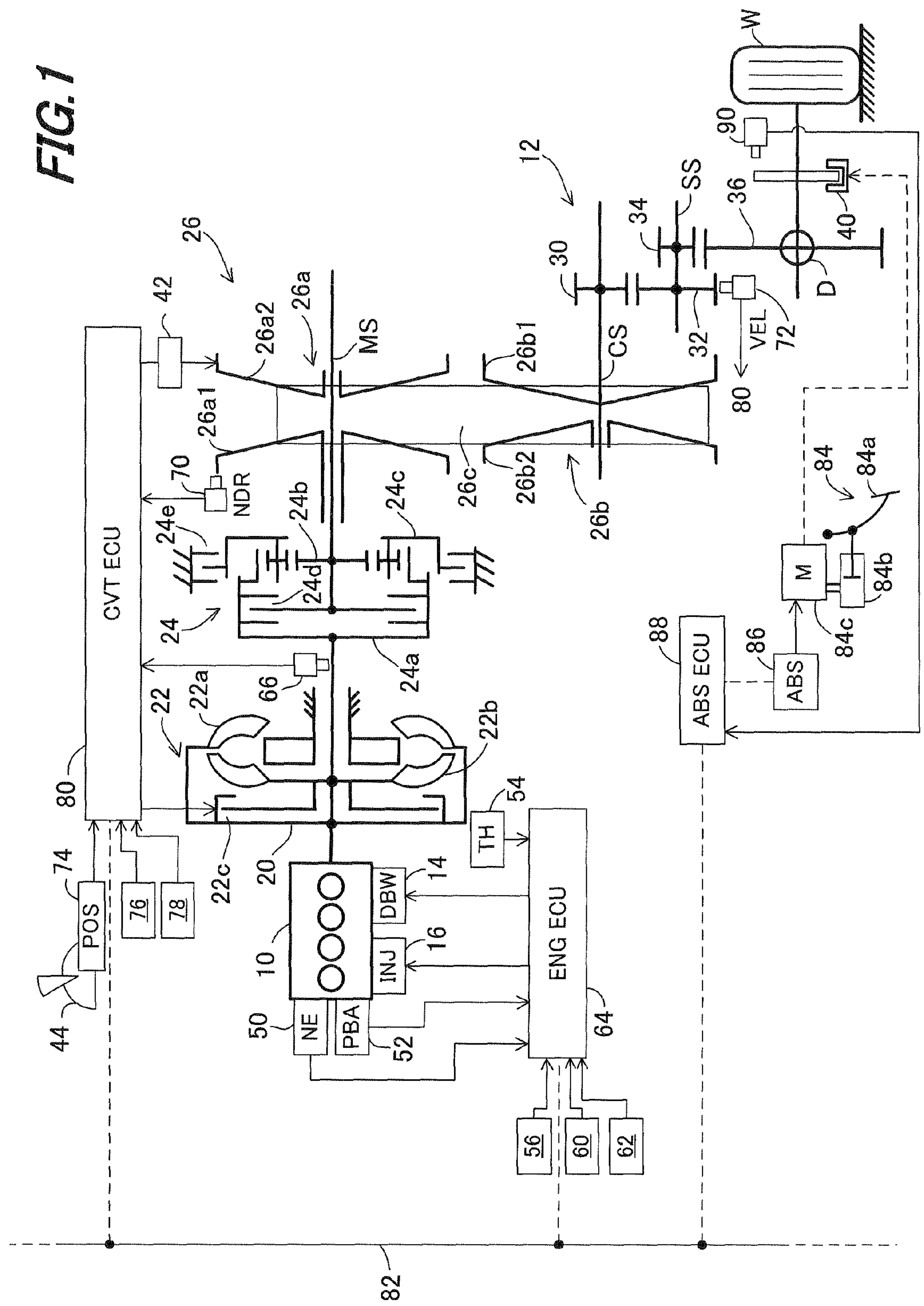
FIG. 1 is an overall view schematically showing a CVT control apparatus according to an embodiment of this invention.

FIG. 1 is an overall view schematically showing a CVT control apparatus according to an embodiment of this invention.

In FIG. 1, a symbol 10 indicates a four-cylinder internal combustion engine (prime mover; hereinafter called the "engine"). The engine 10 is mounted on a vehicle (partially shown with its driven wheel W etc.) 12.

In the engine 10, a throttle valve (not shown) installed in the air intake system has no mechanical connection with an accelerator pedal (not shown) provided at the operator's (driver's) seat of the vehicle 12 but is connected to a DBW (Drive-By-Wire) mechanism 14 including an actuator such as an electric motor.

In the air intake system, the intake air regulated by the throttle valve is flown through an intake manifold (not shown) and mixed with fuel injected from an injector (fuel injection valve) 16 in the vicinity of an intake port of each cylinder. Upon the open of an intake valve (not shown), the resulting air-fuel mixture is flown into a combustion chamber (not shown) in the cylinder concerned. The air-fuel mixture is ignited and burned in the combustion chamber to drive a piston (not shown) to rotate the crankshaft (not shown) and then discharged to the exterior of the engine 10 as the exhaust gas.

The crankshaft of the engine 10 is fixed at a drive plate 20. The drive plate 20 is connected to a pump impeller 22*a* of a torque converter 22 that functions also as a flywheel mass, while a turbine runner 22*b* installed to face the pump impeller 22*a* and adapted to receive fluid (operating oil) is connected to a main shaft (transmission input shaft) MS. A symbol 22*c* indicates a lockup clutch (frictional engaging element).

A Continuous Variable Transmission (CVT) 26 is connected at a position downstream of the torque converter 22 through a forward/reverse switch mechanism 24.

The CVT 26 comprises a drive pulley 26*a* disposed on the main shaft MS, a driven pulley 26*b* disposed on a countershaft CS installed parallel to the main shaft MS, and a metal belt 26*c* adapted to be wound (run) around the pulleys 26*a*, 26*b*.

The drive pulley 26*a* has a fixed pulley-half 26*a*1 that is installed on the main shaft MS to be rotatable relative to the shaft MS, but immovable in the longitudinal direction of the shaft MS, and a movable pulley-half 26*a*2 that is movable in the longitudinal direction of the shaft MS relative to the fixed pulley-half **26*a*1. The driven pulley 26*b* has a fixed pulley-half 26*b*1 that is installed on the countershaft CS to be not rotatable relative to the shaft CS and immovable in the longitudinal direction of the shaft CS, and a movable pulley-half 26*b*2 that is movable in the longitudinal direction of the shaft CS relative to the fixed pulley-half 26*b*1**.

The belt **26*c* comprises two rings (arranged side by side) and a number of (e.g., 400) elements held by the two rings. The elements are pressed sequentially one after another to transmit torque from the drive pulley 26*a* to the driven pulley 26*b***.

The forward/reverse switch mechanism 24 comprises a ring gear **24*a* fixed on the main shaft MS, a sun gear 24*b* fixed at the fixed pulley-half 26*a*1 of the drive pulley 26*a* of the CVT 26, a pinion gear carrier 24*c* disposed therebetween, a forward clutch (frictional engaging element) 24*d* that can engage the ring gear 24*a* with the sun gear 24*b*, and a reverse brake clutch (frictional engaging element) 24*e* that can engage the pinion gear carrier 24*c*** with a transmission case (not shown).

A secondary drive gear 30 fixed on the countershaft CS meshes with a secondary driven gear 32 fixed on a secondary shaft SS. A final drive gear 34 fixed on the secondary shaft SS meshes with a final driven gear 36 of a differential mechanism D.

With the foregoing configuration, the rotation of the countershaft CS is transmitted to the secondary shaft SS through the gears 30, 32, and the rotation of the secondary shaft SS is transmitted through the gears 34, 36 to the differential mechanism D, where it is divided and distributed to the right and left driven wheels (tires; only the right wheel shown) W. A disk brake 40 is disposed near the driven wheel W.

Figure 2:
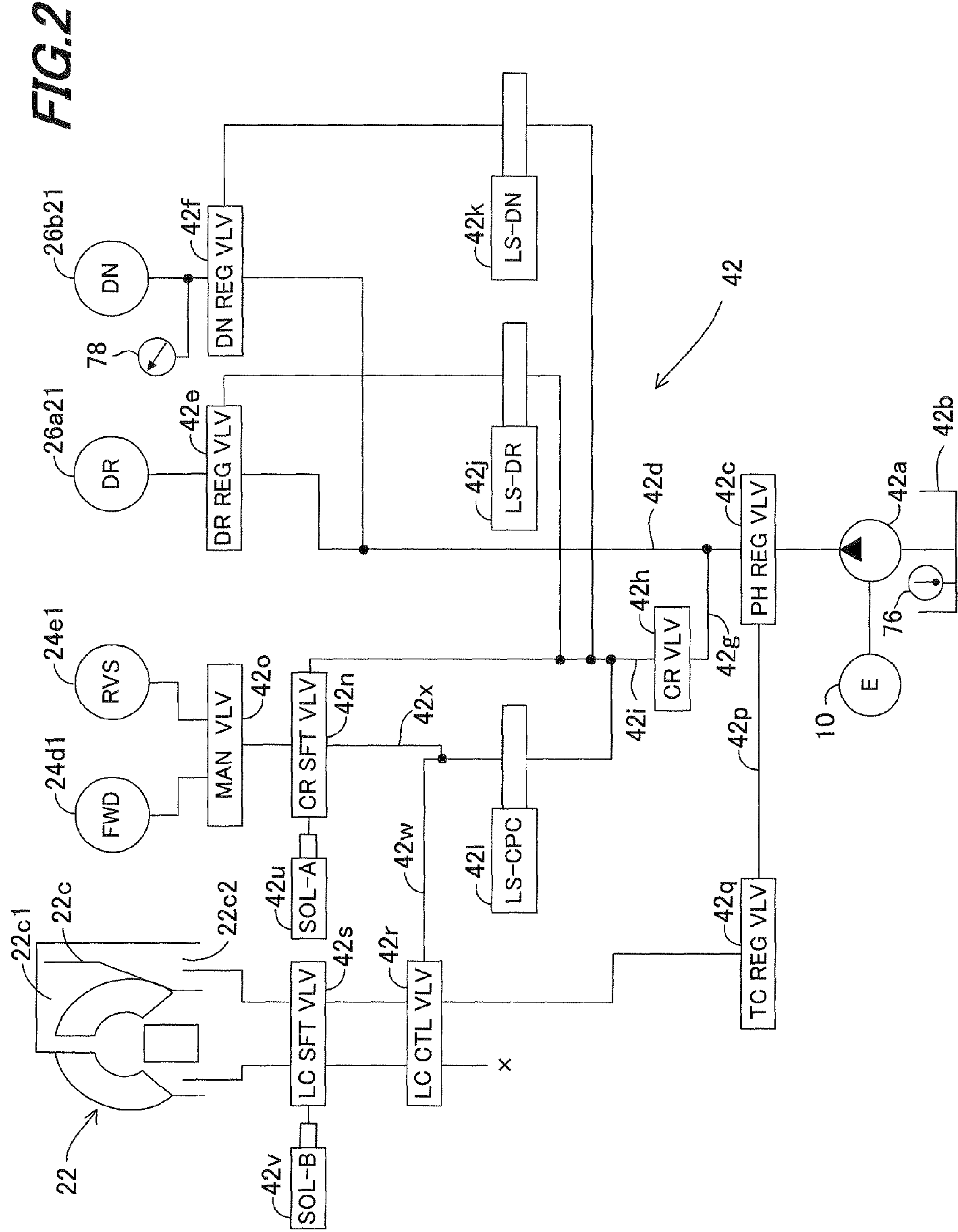
FIG. 2 is a schematic hydraulic circuit diagram showing a hydraulic mechanism such as a CVT shown in FIG. 1.

FIG. 2 is a schematic hydraulic circuit diagram showing a hydraulic mechanism (assigned by a symbol 42) of the CVT 26, etc.

As shown, a hydraulic pump **42*a* is provided in the hydraulic mechanism 42. The hydraulic pump 42*a* comprising a vane pump is driven by the engine 10 to pump up the operating oil stored in a reservoir 42*b* and forward the pressurized oil to a PH regulator valve (PH REG VLV) 42*c***.

An output (PH pressure; line pressure) of the PH regulator valve **42*c* is supplied via an oil passage 42*d* and first and second regulator valves (DR REG VLV, DN REG VLV) 42*e*, 42*f* to a piston chamber (DR) 26*a*21 of the movable pulley-half 26*a*2 of the drive pulley 26*a* of the CVT 26 and to a piston chamber (DN) 26*b*21 of the movable pulley-half 26*b*2 of the driven pulley 26*b* thereof, while being supplied to a CR valve (CR VLV) 42*h* through an oil passage 42*g***.

The CR valve **42*h* decreases the PH pressure to generate CR pressure (control pressure) to be supplied to first, second and third (electromagnetic) linear solenoid valves 42*j*, 42*k*, 42*l* (LS-DR, LS-DN, LS-CPC) through an oil passage 42*i*. The first and second linear solenoid valves 42*j*, 42*k* apply the output pressure, which is determined in response to magnetization of their solenoids, to first and second regulator valves 42*e*, 42*f* to supply the operating oil of the PH pressure supplied through the oil passage 42*d* to the piston chambers 26*a*21, 26*b*21 of the movable pulley-halves 26*a*2, 26*b*2**, thereby generating the pulley clamping pressure in response thereto.

Therefore, in the configuration shown in FIG. 1, the pulley clamping pressure for moving the movable pulley-halves **26*a*2, 26*b*2 longitudinally is generated to change the pulley widths of the drive pulley 26*a* and driven pulley 26*b* so as to vary winding radiuses of the belt 26*c*. Thus, a gear ratio at which an output of the engine 10** is transmitted to the driven wheel W can be continuously or steplessly changed by regulating the pulley clamping pressure.

Returning to the explanation of FIG. 2, an output (CR pressure) of the CR valve **42*h* is also supplied to a CR shift valve (CR SFT VLV) 42*n* and then supplied via a manual valve (MAN VLV) 42*o* to a piston chamber (FWD) 24*d*1 of the forward clutch 24*d* of the forward/reverse switch mechanism 24 and a piston chamber (RVS) 24*e*1 of the reverse brake clutch 24*e*** thereof.

The operation of the forward clutch **24*d* and reverse brake clutch 24*e* is determined upon the manipulation of a select lever 44 (shown in FIG. 1) provided at the operator's seat of the vehicle 12 and having ranges (positions) of, for example, P, R, N, D, S and L, by the operator to select one of the ranges. Specifically, when the operator selects one of the ranges by the select lever 44, the selection is transmitted to the manual valve 42*o* of the hydraulic mechanism 42**.

For instance, when one of the D, S and L ranges, i.e., the forward travel range is selected, a spool of the manual valve **42*o* is displaced in response thereto to discharge the operating oil (hydraulic pressure) from the piston chamber 24*e*1 of the reverse brake clutch 24*e*, while supplying the operating oil to the piston chamber 24*d*1 of the forward clutch 24*d* so that the forward clutch 24*d* is engaged. Upon the engagement of the forward clutch 24, all the gears are rotated integrally with the main shaft MS and the drive pulley 26*a* is driven to be rotated in the same direction as the main shaft MS, i.e., the direction which makes the vehicle 12** travel forward.

On the other hand, when the R range, i.e., the reverse travel range is selected, the operating oil is discharged from the piston chamber **24*d*1 of the forward clutch 24*d*, while being supplied to the piston chamber 24*e*1 of the reverse brake clutch 24*e* so that the reverse brake clutch 24*e* is engaged. Accordingly, the pinion gear carrier 24*c* is fixed to the transmission case, the sun gear 24*b* is driven in the opposite direction from the ring gear 24*a*, and the drive pulley 26*a* is driven to be rotated in the opposite direction from the main shaft MS, i.e., in the direction which makes the vehicle 12** travel reversely (backward).

When the P or N range is selected, the operating oil is discharged from both of the piston chambers to disengage both the forward clutch **24*d* and reverse brake clutch 24*e* and cut off the power transmission through the forward/reverse switch mechanism 24 so that the power transmission between the engine 10 and the drive pulley 26*a* of the CVT 26** is blocked.

The output of the PH regulator valve **42*c* is supplied to a TC regulator valve (TC REG VLV) 42*q* through an oil passage 42*p* and an output of the TC regulator valve 42*q* is supplied to an LC shift valve (LC SFT VLV) 42*s* through an LC control valve (LC CTL VLV) 42*r*. An output of the LC shift valve 42*s* is supplied to a piston chamber 22*c*1 of the lockup clutch 22*c* and also to a chamber (back pressure chamber) 22*c*2 disposed on the back side of the piston chamber 22*c*1**.

The CR shift valve **42*n* and LC shift valve 42*s* are connected to first and second (electromagnetic) ON/OFF solenoids (SOL-A, SOL-B) 42*u*, 42*v*. Upon the magnetization/demagnetization of the solenoids 42*u*, 42*v*, the operation of oil passage to the forward clutch 24*d* and engaging/disengaging of the lockup clutch 22*c*** are controlled.

In the lockup clutch **22*c*, when the operating oil is supplied to the piston chamber 22*c*1 and discharged from the back pressure chamber 22*c*2 through the LC shift valve 42*s*, the lockup clutch 22*c* is engaged (fastened; made ON). In contrast, when the operating oil is supplied to the back pressure chamber 22*c*2 and discharged from the piston chamber 22*c*1, the lockup clutch 22*c*** is disengaged (unfastened; made OFF).

A slip amount of the lockup clutch 22*c*, i.e., the capacity of engagement when the lockup clutch 22*c* is slipped between the engaged and disengaged conditions, is determined depending on an amount of the operating oil (hydraulic pressure) supplied to the piston chamber 22*c*1 and back pressure chamber 22*c*2.

In the apparatus, thus, there are provided with the frictional engaging elements comprising the lockup clutch 22*c*, forward clutch 24*d* and reverse brake clutch 24*e* that transmit the power of the engine 10 to the driven wheel W through frictional engagement by (clutch) capacity determined by hydraulic pressure supplied from the hydraulic mechanism 42.

The aforementioned third linear solenoid valve 42*l* is connected to the LC shift valve 42*s* through an oil passage 42*w* and the LC control valve 42*r*, and further to the CR shift valve 42*n* through an oil passage 42*x*. Specifically, the capacity of engagement (clutch capacity; slip amount) of the forward clutch 24*d* and lockup clutch 22*c* is regulated or controlled in response to the magnetization/demagnetization of the third linear solenoid valve 42*l*.

The explanation on FIG. 1 will be resumed. A crank angle sensor 50 is installed at an appropriate position, e.g., near the camshaft (not shown) of the engine 10, and produces a pulse signal at a position near the TDC of the piston and every predetermined crank angle position. A manifold absolute pressure sensor 52 is installed at an appropriate position downstream of the throttle valve in the intake system and produces an output or signal proportional to manifold absolute pressure (indicative of engine load) PBA.

A throttle opening sensor 54 installed at the actuator of the DBW mechanism 14 produces an output or signal proportional to throttle opening TH based on a rotational amount of the actuator, and an accelerator position sensor 56 installed near the accelerator pedal produces an output or signal proportional to accelerator position or opening AP corresponding to an amount of operator's depression of the accelerator pedal.

Further, a coolant temperature sensor 60 installed near a coolant passage (not shown) of the engine 10 produces an output or signal indicative of engine coolant temperature TW, i.e., the temperature of the engine 10, and an intake air temperature sensor 62 installed in the air intake system produces an output or signal indicative of temperature (ambient temperature) TA of the intake air to be sucked in the engine 10.

The outputs of the crank angle sensor 50 and other sensors are sent to an engine Electronic Control Unit (engine ECU; hereinafter called the "ENG ECU") 64. The ENG ECU 64 has a microcomputer including a CPU, ROM, RAM, I/O, etc., a waveform shaping circuit, and other devices. The ENG ECU 64 measures a time interval between the output pulses of the crank angle sensor 50 to detect engine speed NE, determines desired throttle opening based on the detected engine speed NE and other sensor outputs so as to control the operation of the DBW mechanism 14, and determines a fuel injection amount to operate the injector 16.

An NT sensor (rotational speed sensor) 66 installed at an appropriate position near the main shaft MS produces a pulse signal indicative of rotational speed of the main shaft MS which corresponds to rotational speed of the turbine runner 22*b*. An NDR sensor (rotational speed sensor) 70 installed at an appropriate position near the drive pulley 26*a* of the CVT 26 produces an output or signal indicative of rotational speed of the drive pulley 26*a*.

A VEL sensor (rotational speed sensor) 72 is installed near the secondary driven gear 32 of the secondary shaft SS and produces a pulse signal indicating output rotational speed of the CVT 26, i.e., rotational speed of the driven pulley 26*b* or vehicle speed VEL, based on rotational speed of the secondary driven gear 32. A select lever sensor 74 installed near the select lever 44 produces an output or signal corresponding to a range such as R, N, D or the like selected by the operator.

In the hydraulic mechanism 42, an oil temperature sensor 76 is disposed in the reservoir 42*b* and produces an output or signal indicative of temperature of the operating oil. A hydraulic pressure sensor 78 is installed at an oil passage connected to the piston chamber 26*b*21 of the movable pulley-half 26*b*2 of the driven pulley 26*b* and produces an output or signal indicative of pressure (hydraulic pressure) of the operating oil to be supplied to the piston chamber 26*b*21.

The outputs of the NT sensor 66, etc., are sent to a CVT ECU 80. The CVT ECU 80 also comprises an Electronic Control Unit similarly having a microcomputer including a CPU, ROM, RAM, I/O, etc., a waveform shaping circuit, and other devices. The CVT ECU 80 is connected to the ENG ECU 64 through a bus 82 to be able to communicate therewith.

In the CVT ECU 80, the outputs of the NT sensor 66 and NDR sensor 70 are inputted to the waveform shaping circuit and based on the outputs, the CPU detects the rotational speed. The output of the VEL sensor 72 is inputted to the waveform shaping circuit and then to a direction detecting circuit. The CPU counts outputs of the waveform shaping circuit to detect the output rotational speed of the CVT 26 (i.e., rotational speed of the driven pulley 26*b* and the vehicle speed), while detecting a rotational direction of the CVT 26 based on an output of the direction detecting circuit.

Based on the detected values and information obtained from the ENG ECU 64, the CVT ECU 80 calculates the output of the engine 10, and based on the calculated engine output and a slip ratio of the torque converter 22, calculates torque to be transmitted by the belt 26*c*, and based on the calculated transmission torque, calculates necessary pulley clamping pressure. It should be noted that the clamping pressure ratio of the pulleys 26*a*, 26*b* (indicating the gear ratio, specifically the pulley ratio) is calculated by retrieving a predetermined shift map by the vehicle speed VEL and accelerator position AP so that the engine speed NE becomes a desired value.

Further, based on the calculated pulley clamping pressure, the CVT ECU 80 determines hydraulic pressure to be supplied to the CVT 26 and magnetizes/demagnetizes the electromagnetic solenoid valve 42*j*, etc., of the hydraulic mechanism 42 to control the operation of the CVT 26, while controlling the engagement/disengagement of the lockup clutch 22*c* of the torque converter 22, the forward clutch 24*d* and the reverse brake clutch 24*e*.

The vehicle 12 is provided with a brake mechanism 84, an ABS mechanism 86 that reduces the braking force applied to the driven wheel W to prevent a skid from occurring, and an ABS ECU (ABS Electronic Control Unit; ABS controller) 88 that also comprises a microcomputer and controls the operation of the ABS mechanism 86 when the driven wheel W is detected to be locked.

The brake mechanism 84 is connected to a brake pedal 84*a*, and comprises a master cylinder 84*b* filled with brake oil and a modulator (master-vac or vacuum brake booster; indicated by M in the drawing) 84*c* that doubles the braking force. When the brake pedal 84*a* is manipulated by the operator, the brake mechanism 84 supplies brake oil pressure to the disk brake 40 to brake the driven wheel W.

The brake mechanism 84 is connected to the ABS ECU 88. A wheel speed sensor 90 is installed near a drum of the disk brake 40 of each of the four wheels including the driven wheels W (and free wheels). The wheel speed sensor 90 produces an output or signal indicative of rotational speed of the associated wheel and sends the output to the ABS ECU 88.

When the lock of the driven wheel W is detected based on the output of the wheel speed sensor 90, the ABS ECU 88 reduces the braking force applied to the driven wheel W through the brake mechanism 84, thereby preventing a skid from occurring. The ABS ECU 88 is connected to the CVT ECU 80 and ENG ECU 64 via the bus 82 so as to be able to communicate therewith.

Figure 3:
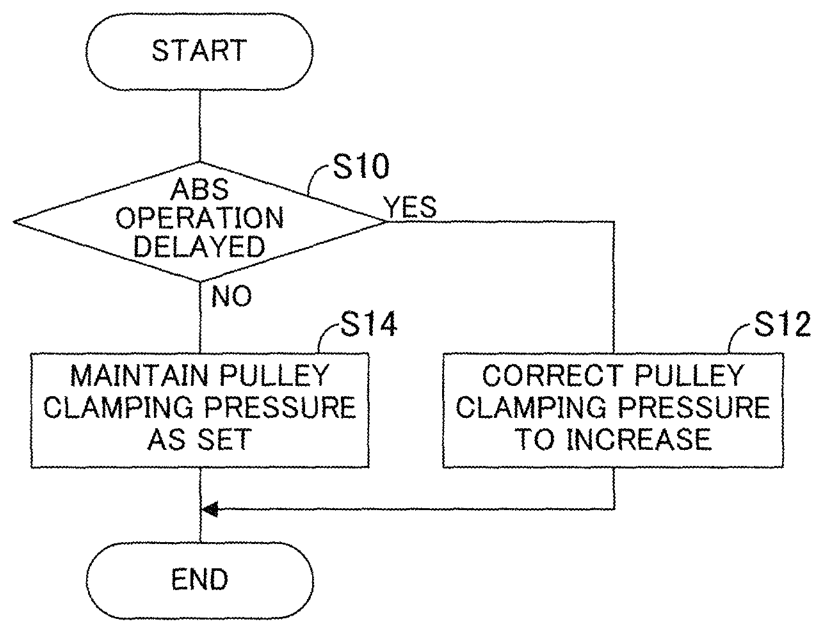
FIG. 3 is a flowchart showing the operation of the apparatus shown in FIG. 1.

FIG. 3 is a flowchart showing the operation of the CVT ECU 80. The illustrated program is executed by the CVT ECU 80 at predetermined intervals, e.g., 10 milliseconds.

The program begins at S10, in which it is determined whether the operation of the ABS mechanism 86 is delayed. This determination is made by communicating with the ABS ECU 88 via the bus 82.

Specifically, the ABS ECU 88 discriminates based on the output of the wheel speed sensor 90 whether the vehicle 12 travels on a rough road or whether a tire chain (skid chain) is fastened over the tread of a tire (the wheel such as the driven wheel W), and when the discrimination is affirmative, delays the operation of the ABS mechanism 86.

When the ABS ECU 88 determines to delay the operation of the ABS mechanism 86, the determination of S10 becomes affirmative and the program proceeds to S12, in which the pulley clamping pressure is corrected to increase.

On the other hand, when the ABS ECU 88 determines not to delay the operation of the ABS mechanism 86, the determination of S10 becomes negative and the program proceeds to S14, in which the pulley clamping pressure is maintained as set (as it is).

Thus, this embodiment is configured to correct the set pulley clamping pressure in accordance with the determination result of the ABS ECU 88 as to whether the operation of the ABS mechanism 86 is delayed, more exactly, correct the set pulley clamping pressure to increase when it is determined that the operation of the ABS mechanism 86 is delayed.

It should be noted that the processing of S10 may be configured such that the CVT ECU 80 itself is inputted with the output of the wheel speed sensor 90 (or an alternative sensor in place thereof), based on the output, determines whether the vehicle 12 travels on a rough road or whether a tire chain is fastened on the wheel such as the driven wheel W, and upon the affirmative determination result, determines that the operation of the ABS mechanism 86 is delayed.

Further, in S12, in addition to the correction of increasing the clamping pressure of the pulleys 26*a*, 26*b*, the CVT ECU 80 decreases the clutch capacity of the forward clutch 24*d* or reverse brake clutch 24*e*, or decreases the clutch capacity of the lockup clutch 22*c*.

Specifically, in the frictional engaging elements comprising the lockup clutch 22*c*, forward clutch 24*d* and reverse brake clutch 24*e* that transmit the power of the engine 10 to the driven wheel W through frictional engagement by the capacity determined by hydraulic pressure supplied from the hydraulic mechanism 34, the hydraulic pressure is decreased to reduce the capacity in accordance with a determination result of the ABS ECU 88.

Due to the decrease in the clutch capacity of the clutch 24*d* (24*e*) or 22*c*, it becomes possible to mitigate the influence that adversely affects the durability of the CVT 26.

In the foregoing, the opposite configuration from the above can be applied. Specifically, it may be configured such that, when the ABS ECU 88 determines to delay the operation of the ABS mechanism 86, the result of S10 becomes affirmative and the program proceeds to S12, in which the pulley clamping pressure is maintained as set, while, when the ABS ECU 88 determines not to delay the operation of the ABS mechanism 86, the result in S10 becomes negative and the program proceeds to S14, in which the pulley clamping pressure is corrected to decrease.

Furthermore, it may be alternatively configured such that, when the ABS ECU 88 determines to delay the operation of the ABS mechanism 86, the result of S10 becomes affirmative and the program proceeds to S12, in which the set pulley clamping pressure is corrected to increase by a first correction amount, while, when the ABS ECU 88 determines not to delay the operation of the ABS mechanism 86, the result in S10 becomes negative and the program proceeds to S14, in which the set pulley clamping pressure is corrected to increase by a second correction amount (which is smaller than the first correction amount).

That is, it suffices if the pulley clamping pressure when the ABS ECU 88 determines to delay the operation of the ABS mechanism 86 is greater than that when the ABS ECU 88 determines not to delay the operation of the ABS mechanism 86.

More specifically, it suffices if a correction amount of the pulley clamping pressure (or the pulley clamping pressure itself) when the ABS ECU 88 determines to delay the operation of the ABS mechanism 86 is greater than a correction amount (or the pulley clamping pressure itself) when the ABS ECU 88 determines not to delay the operation of the ABS mechanism 86.

As stated above, the embodiment is configured to have an apparatus for and method of controlling a CVT (26) mounted on a vehicle (12) and transmitting power of a prime mover (engine 10) to a driven wheel (W) through a belt (26*c*) wound around a drive pulley (26*a*) and a driven pulley (26*b*) that are supplied with hydraulic clamping pressure from a hydraulic mechanism (42) to clamp the belt from lateral sides, an ABS mechanism (86) adapted to reduce braking force to be applied to the driven wheel and an ABS controller (ABS ECU 88) for controlling operation of the ABS mechanism when the driven wheel is detected to be locked, characterized by: a pulley clamping pressure setting unit (CVT ECU 80) that sets the hydraulic clamping pressure of the pulleys based on torque to be transmitted by the belt; an ABS operation delay determiner (CVT ECU 80, S10) that determines whether the operation of the ABS mechanism is delayed by the ABS controller; and a clamping pressure corrector (CVT ECU 80, S12, S14) that corrects the set hydraulic clamping pressure of the pulleys in accordance with a determination result of the ABS operation delay determiner.

With this, it becomes possible to correct the pulley clamping pressure to increase only when it is determined that the operation of the ABS mechanism 86 is delayed, i.e., the pulley clamping pressure is corrected to increase only when needed, thereby improving durability of the CVT 26.

In the apparatus and method, the clamping pressure corrector corrects the set hydraulic clamping pressure such that the hydraulic clamping pressure when the ABS operation delay determiner determines that the operation of the ABS mechanism is delayed, is greater than that when the ABS operation delay determiner determines that the operation of the ABS mechanism is not delayed (S10, S12, S14).

Specifically, the clamping pressure corrector corrects the set hydraulic clamping pressure to increase when the ABS operation delay determiner determines that the operation of the ABS mechanism is delayed, while maintaining the set clamping pressure as set when the ABS operation delay determiner determines that the operation of the ABS mechanism is not delayed (S10, S12, S14).

More specifically, the clamping pressure corrector corrects the set hydraulic clamping pressure to increase by a first correction amount when the ABS operation delay determiner determines that the operation of the ABS mechanism is delayed, while correcting the set hydraulic clamping pressure to increase by a second correction amount which is less than the first correction amount when the ABS operation delay determiner determines that the operation of the ABS mechanism is not delayed (S10, S12, S14).

With this, it becomes possible to achieve the aforementioned effect more reliably.

The apparatus and method further includes: a frictional engaging element (lockup clutch 22*c*, forward clutch 24*d* and reverse brake clutch 24*e*) that transmits the power of the prime mover (engine 10) to the driven wheel (W) through frictional engagement by a (clutch) capacity determined by hydraulic pressure supplied from the hydraulic mechanism 42; and the clamping pressure corrector (CVT ECU 80, S12, S14) decreases the hydraulic pressure to reduce the capacity in accordance with a determination result of the ABS operation delay determiner.

With this, due to the decrease in the clutch capacity of the clutch 22*c*, 24*d*, 24*e*, it becomes possible to mitigate the influence that adversely affects the durability of the CVT 26.

The apparatus and method further includes: a wheel speed sensor (90) that produces an output indicative of rotational speed of each wheel including the driven wheel (W); and the ABS controller (ABS ECU 88) delays the operation of the ABS mechanism when it is discriminated from the output of the wheel speed sensor that the vehicle travels on a rough road or a tire chain is fastened over the wheel.

It should be noted that, although, in the foregoing, the explanation is made on the vehicle 12 having the two driven wheels W driven by the CVT 26 and the free wheels rotated with the driven wheels W, this invention can be applied to a all-wheel drive type vehicle that has the CVT 26 and drives the four wheels.

Japanese Patent Application No. 2009-251086 filed on Oct. 30, 2009 is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling a CVT mounted on a vehicle that has an ABS mechanism adapted to reduce braking force to be applied to a driven wheel and an ABS controller for controlling operation of the ABS mechanism when the driven wheel is detected to be locked and transmitting power of a prime mover to the driven wheel through a belt wound around a drive pulley and a driven pulley that are supplied with hydraulic clamping pressure from a hydraulic mechanism to clamp the belt from lateral sides, the apparatus comprising:

a pulley clamping pressure setting unit that sets the hydraulic clamping pressure of the pulleys based on torque to be transmitted by the belt;

an ABS operation delay determiner that determines whether the operation of the ABS mechanism is delayed by the ABS controller; and a clamping pressure corrector that corrects the set hydraulic clamping pressure of the pulleys in accordance with a determination result of the ABS operation delay determiner, wherein the clamping pressure corrector corrects the set hydraulic clamping pressure such that the hydraulic clamping pressure when the ABS operation delay determiner determines that the operation of the ABS mechanism is delayed, is greater than that when the ABS operation delay determiner determines that the operation of the ABS mechanism is not delayed.

2. The apparatus according to claim 1, wherein the clamping pressure corrector corrects the set hydraulic clamping pressure to increase when the ABS operation delay determiner determines that the operation of the ABS mechanism is delayed, while maintaining the set clamping pressure as set when the ABS operation delay determiner determines that the operation of the ABS mechanism is not delayed.

3. The apparatus according to claim 1, wherein the clamping pressure corrector corrects the set hydraulic clamping pressure to increase by a first correction amount when the ABS operation delay determiner determines that the operation of the ABS mechanism is delayed, while correcting the set hydraulic clamping pressure to increase by a second correction amount which is less than the first correction amount when the ABS operation delay determiner determines that the operation of the ABS mechanism is not delayed.

4. The apparatus according to claim 1, further including:

a frictional engaging element that transmits the power of the prime mover to the driven wheel through frictional engagement by a capacity determined by hydraulic pressure supplied from the hydraulic mechanism;

and the clamping pressure corrector decreases the hydraulic pressure to reduce the capacity in accordance with a determination result of the ABS operation delay determiner.

5. The apparatus according to claim 1, further including:

a wheel speed sensor that produces an output indicative of rotational speed of each wheel including the driven wheel;

and the ABS controller delays the operation of the ABS mechanism when it is discriminated from the output of the wheel speed sensor that the vehicle travels on a rough road or a tire chain is fastened over the wheel.

6. A method of controlling a CVT mounted on a vehicle that has an ABS mechanism adapted to reduce braking force to be applied to a driven wheel and an ABS controller for controlling operation of the ABS mechanism when the driven wheel is detected to be locked and transmitting power of a prime mover to the driven wheel through a belt wound around a drive pulley and a driven pulley that are supplied with hydraulic clamping pressure from a hydraulic mechanism to clamp the belt from lateral sides, the method comprising the steps of:

setting the hydraulic clamping pressure of the pulleys based on torque to be transmitted by the belt;

determining whether the operation of the ABS mechanism is delayed by the ABS controller; and correcting the set hydraulic clamping pressure of the pulleys in accordance with a determination result of the ABS operation delay determiner, wherein the step of clamping pressure correcting corrects the set hydraulic clamping pressure such that the hydraulic clamping pressure when the ABS operation delay determiner determines that the operation of the ABS mechanism is delayed, is greater than that when the ABS operation delay determiner determines that the operation of the ABS mechanism is not delayed.

7. The method according to claim 6, wherein the step of clamping pressure correcting corrects the set hydraulic clamping pressure to increase when the ABS operation delay determiner determines that the operation of the ABS mechanism is delayed, while maintaining the set clamping pressure as set when the ABS operation delay determiner determines that the operation of the ABS mechanism is not delayed.

8. The method according to claim 6, wherein the step of clamping pressure correcting corrects the set hydraulic clamping pressure to increase by a first correction amount when the ABS operation delay determiner determines that the operation of the ABS mechanism is delayed, while correcting the set hydraulic clamping pressure to increase by a second correction amount which is less than the first correction amount when the ABS operation delay determiner determines that the operation of the ABS mechanism is not delayed.

9. The method according to claim 6, further including:

a frictional engaging element that transmits the power of the prime mover to the driven wheel through frictional engagement by a capacity determined by hydraulic pressure supplied from the hydraulic mechanism;

and the step of clamping pressure correcting decreases the hydraulic pressure to reduce the capacity in accordance with a determination result of the ABS operation delay determiner.

10. The method according to claim 6, further including:

a wheel speed sensor that produces an output indicative of rotational speed of each wheel including the driven wheel;

and the ABS controller delays the operation of the ABS mechanism when it is discriminated from the output of the wheel speed sensor that the vehicle travels on a rough road or a tire chain is fastened over the wheel.

* * * * *